US011062446B2

(12) United States Patent
Choi et al.

(10) Patent No.: US 11,062,446 B2
(45) Date of Patent: Jul. 13, 2021

(54) ANALYZING METHOD FOR PEROVSKITE STRUCTURE USING MACHINE LEARNING

(71) Applicant: POSTECH ACADEMY-INDUSTRY FOUNDATION, Pohang-si (KR)

(72) Inventors: Si-Young Choi, Pohang-si (KR); Gi-Yeop Kim, Gimhae-si (KR); Kyoung-June Ko, Pohang-si (KR); Jin-Hyuk Jang, Ulsan (KR)

(73) Assignee: Rostech Academy-Industry Foundation, Pohang-si (KR)

( * ) Notice: Subject to any disclaimer, the term of this patent is extended or adjusted under 35 U.S.C. 154(b) by 59 days.

(21) Appl. No.: 16/586,854

(22) Filed: Sep. 27, 2019

(65) Prior Publication Data

US 2020/0143533 A1  May 7, 2020

(30) Foreign Application Priority Data

Nov. 7, 2018  (KR) ........................ 10-2018-0136190

(51) Int. Cl.
    G06K 9/00       (2006.01)
    G06T 7/00       (2017.01)
    G06T 7/60       (2017.01)
    G06T 5/00       (2006.01)
    G06T 7/70       (2017.01)
    G06N 3/04       (2006.01)
    G06N 3/08       (2006.01)

(52) U.S. Cl.
    CPC ............. *G06T 7/0012* (2013.01); *G06N 3/04* (2013.01); *G06N 3/08* (2013.01); *G06T 5/002* (2013.01); *G06T 7/60* (2013.01); *G06T 7/70* (2017.01); *G06T 2207/10061* (2013.01); *G06T 2207/20081* (2013.01); *G06T 2207/20084* (2013.01); *G06T 2207/30024* (2013.01)

(58) Field of Classification Search
    CPC .......... G06N 3/08; G06N 3/04; G06N 3/0454; G06T 2207/10061; G06T 2207/20081; G06T 2207/20084; G06T 2207/30024; G06T 5/002; G06T 7/0012; G06T 7/60; G06T 7/70; G06T 2207/30136; G06T 7/0004; G01N 21/84; G01N 27/62
    See application file for complete search history.

(56) References Cited

U.S. PATENT DOCUMENTS

| | | | |
|---|---|---|---|
| 2011/0161361 A1* | 6/2011 | Csanyi ................... | G16C 20/30 707/769 |
| 2013/0189542 A1* | 7/2013 | Ogimoto ............ | C01G 45/1264 428/701 |
| 2016/0285021 A1* | 9/2016 | Yang ................... | H01L 51/0032 |
| 2017/0005296 A1* | 1/2017 | Soci .................... | H01L 51/5072 |
| 2017/0033246 A1* | 2/2017 | Lee ........................ | H01L 31/036 |
| 2018/0061541 A1* | 3/2018 | Araki .................... | C04B 35/624 |
| 2018/0175396 A1* | 6/2018 | Jacobs ................ | H01M 4/9033 |
| 2018/0251381 A1* | 9/2018 | Chung ................ | C01G 99/006 |

* cited by examiner

*Primary Examiner* — Tom Y Lu

(74) *Attorney, Agent, or Firm* — Morgan, Lewis & Bockius LLP

(57) ABSTRACT

A method of analyzing a perovskite structure using machine learning, the method comprising the steps of: (a) obtaining an atomic image using an atomic structure simulator; (b) making a CNN model learn the atomic image; and (c) obtaining an atomic image of an actual substance using a TEM or a STEM and then applying the image to the learnt CNN model.

4 Claims, 4 Drawing Sheets

SIMULATION AND LEARNING

OBTAIN EXPERIMENTAL IMAGE

OCTAHEDRON TILT MAPPING

ANALYZING METHOD FOR PEROVSKITE STRUCTURE USING MACHINE LEARNING

TECHNICAL FIELD

The present invention relates to a method of analyzing a perovskite structure using machine learning, and more particularly, to a method in which atomic structure data acquired through a transmission electron microscope (TEM) or scanning transmission electron microscope (STEM) can be analyzed by using a machine learning technique, and atom arrangement positions, particularly, an octahedral oxygen structure can be analyzed up to a level of several picometer unit.

BACKGROUND ART

Oxides having a perovskite structure have very useful characteristics for superconductivity, ferroelectricity, magnetoresistivity, and thus, various research are being carried out as a functional material. Such characteristics of perovskite material are due to bond hybridization of the d-orbital of transition metals and the p-orbital of oxygen and causes octahedral tilt of the oxygen and transition metals in an atomic structure.

Thus, the imaging and analysis of octahedral tilt structure is an indispensable factor for controlling and designing characteristics of functional oxides. In particular, octahedral tilt is changed into another form according to stress, defect, and the like in a local region such as an interface, and the physical property also varies, and thus, the octahedral tilt structure of oxygen should be analyzed at a unit lattice level.

The oxygen octahedral structures are classified into 23 tilt systems having: a, b, c according to comparison of rotation angles (expressed in a form such as aaa when all are the same and expressed in a form such as aac when one direction is different); and + (the same rotation direction), 0 (case of no-rotation), and − (opposite rotation direction) according to comparison of rotation directions with next unit cell. For example, when there are octahedral tilts in two direction and the angles thereof are the same and the rotation directions are anti-parallel with a next unit cell, the expression thereof can be $a^0b^-b^-$.

Meanwhile, development of scanning transmission electron microscope (STEM) having a merit of being capable of obtaining an atomic structure image having a high resolution of 50 picometer level has been enhancing the understanding about a structure of a material and has remarkably affected the associating the relationship between the structure and characteristics of a material.

However, the degree of structural variation generated in the oxygen octahedron is at a picometer level on a STEM image, and in case of current commercialized STEM data, it is not easy to observe and analyze the data due to noise and the data is easily affected by a subjective view of an observer, and thus, there is difficulty in accurate structural analysis.

PRIOR ART DOCUMENT

Patent Document (Patent Document 1) Korean Patent Publication No. 2006-0033740

DISCLOSURE

Technical Problem

The present invention provides a method in which oxygen octahedral tilt system of a perovskite material can be automatically classified, and atom arrangement positions, particularly, an octahedral oxygen structure can be analyzed up to a level of several picometer unit through a statistical analysis of an obtained STEM image by applying a machine learning technique.

Technical Solution

According to an embodiment of the present invention, the present invention provides a method of analyzing a perovskite structure using machine learning, the method including the steps of: (a) obtaining an atomic image using an atomic structure simulator; (b) making a CNN model learn the atomic image; and (c) obtaining an atomic image of an actual substance using a TEM or a STEM and then applying the image to the learnt CNN model.

In addition, preferably, the atomic image in step (a) may be obtained by using a perovskite octahedron tilt structure confirmed through an experiment, and a computed perovskite octahedron tilt structure model.

In addition, preferably, the CNN model in step (b) may include: a convolutional layer which extracts a geometric feature from the atomic image; and a fully connected layer which connects the geometric feature and specific classification of the perovskite octahedron.

In addition, preferably, in step (c), an oxygen octahedron tilt system may be determined and classified.

In addition, preferably, in step (c), coordinate information of each unit lattice of the perovskite structure and a probability about a structure which the unit lattice has may be output.

In addition, preferably, the atomic image is constructed by using the coordinate information of each unit lattice of the perovskite structure and the probability about a structure which the unit lattice has, whereby oxygen octahedron tilt mapping may be performed.

Advantageous Effects

The method according to the present invention makes it possible to statistically analyze atomic structure data required to discover a mechanism with which novel characteristics of perovskite oxides can be finely adjusted, and thus, the method may be used to understand an atomic structure transition phenomenon in a local area.

An image observed through a TEM or a STEM may include several hundreds of unit lattices having different tilt structures, and thus, it is impossible to directly and manually analyze and maintain objectivity. However, the method according to the present invention is capable of automatically classifying oxygen octahedron tilts and may be particularly useful for analyzing a tilt distribution in an oxide thin film which has an abrupt change in oxygen octahedron tilts on an interface between the thin film and a substrate. Thus, the present invention may contribute to inducement of standardization of atomic structure analysis and design technology, improvement in the amount and speed of image analysis processing, unknown material property analysis, accumulation of data about local atomic structure and associative database creation, and the like.

In addition, the method according to the present invention has a merit of enabling more accurate analysis as data is accumulated.

BEST MODE

Hereinafter, embodiments of the present invention will be described in detail regarding the configuration and actions thereof with reference to the accompanying drawings. Hereinafter, detailed descriptions related to well-known functions or configurations will be ruled out in order not to unnecessarily obscure subject matters of the present invention. Furthermore, when it is described that one part "includes" some components, it does not mean that other components are excluded but means that other elements may be further included if there is no specific contrary indication.

A method according to the present invention roughly includes the steps of: obtaining an image through a STEM image simulation from a perovskite structure model which has a perovskite octahedral tilt structure and various tilt structures confirmed by an experiment (first step); making a CNN learn the image (second step); obtaining a STEM image from an actual specimen required to be analyzed (third step); and decomposing the STEM image obtained in third step using a learnt CNN model for each unit lattice and analyzing the type of a tilt structure which each unit lattice has (fourth step).

First Step (Generation of Training Image)

A machine learning technique is indispensably provided with a large number of training examples, and should have prior knowledge, for training, about the structure that a specific image has.

To this end, in an embodiment of the present invention, not only the existing octahedral tilt structures confirmed through experiments but also the octahedral tilt structure model computed by a first principle computation and the like is obtained, and on the basis of these, an atomic image is obtained by using an atomic structure simulator.

Figure 2:
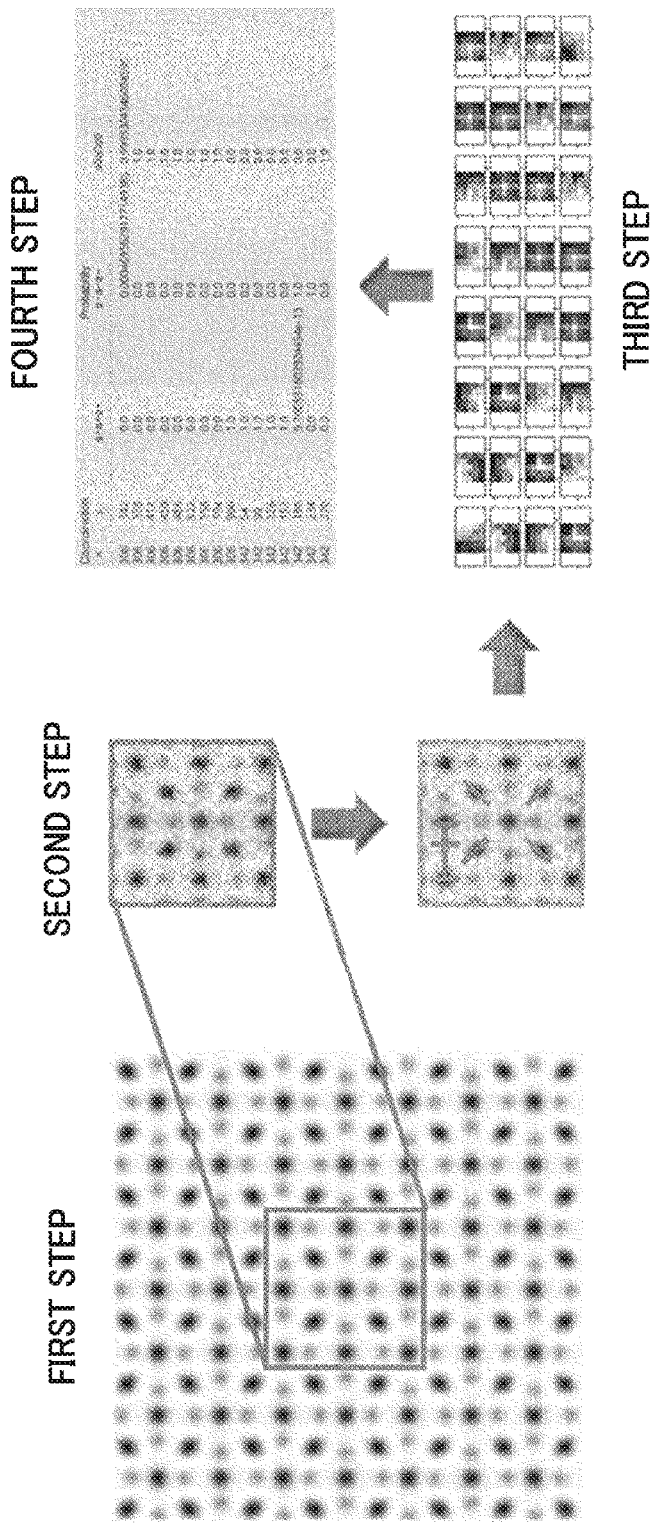
FIG. 2 illustrates a training process through a CNN and output values thereof according to an embodiment of the present invention.

At this point, various training images are obtained, and in order to generate an image similar to an actual image, a noise that may be generated in an experimental process is artificially added (step 1 and step 2 in FIG. 2). Accordingly, the information about each given data point is accurately defined, and a database provided with a large number of examples is constructed.

Second Step (Machine Learning)

In an embodiment of the present invention, machine learning is performed on the atomic image obtained through the atomic structure simulator by using a convolutional neural network (CNN) technique. The CNN is one of machine learning techniques in which a preprocessing is performed on data through a convolution process which is a filtering process for deriving a feature parts with respect to an image, and then, a deep learning step is performed.

Figure 3:
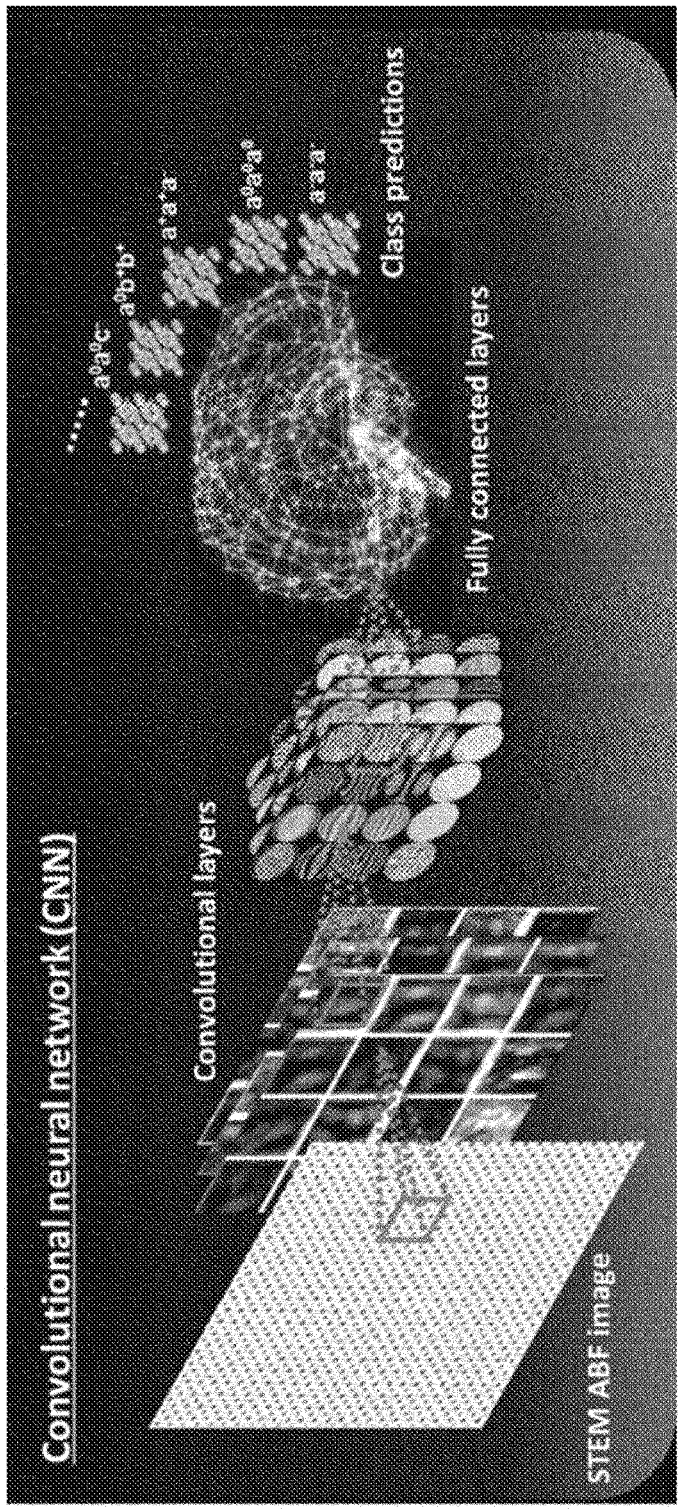
FIG. 3 illustrates a structure of a convolutional neural network (CNN).

Specifically, as shown in FIG. 3, the CNN used in an embodiment of the present invention is configured from: a convolutional layer which builds geometrically representative portions in a provided STEM annular bright field (ABF) image; and a fully connected layer which connects the geometrically representative portions and specific classification.

Figure 4:
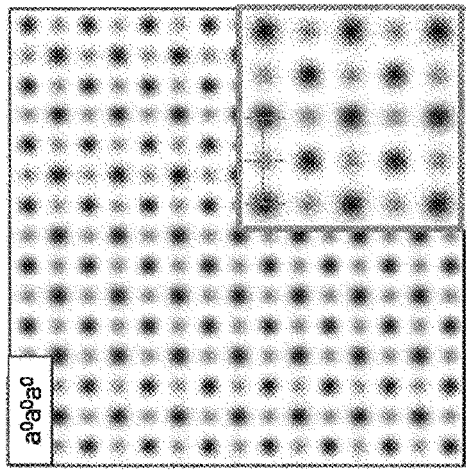
FIG. 4 illustrates a result of performing an analysis according to an embodiment of the present invention.
Figure 4:
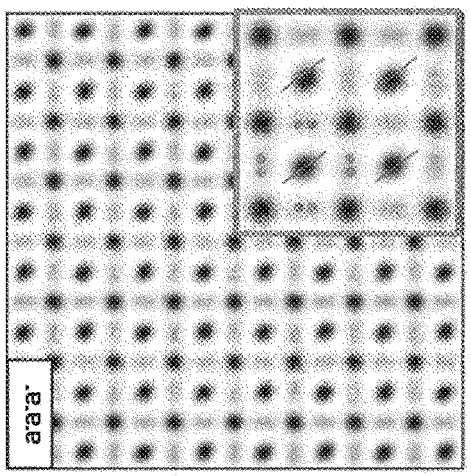
Figure 4:
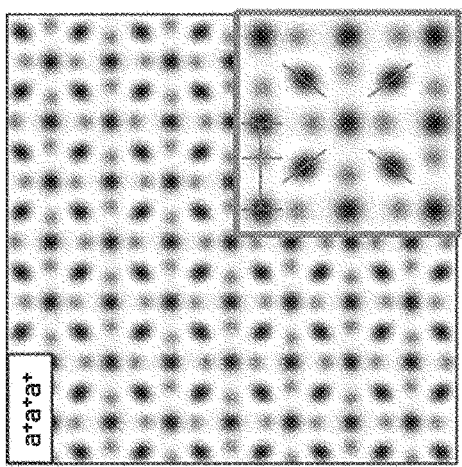

First, in the convolutional layer, the image is divided into a predetermined size, and characteristic portions are filtered and extracted. For example, as shown in FIG. 4, when oxygen octahedral tilts are $a^+a^+a^+$, $a^-a^-a^-$, and $a^0a^0a^0$, filtering is performed so that a structure can be determined through the ratio of the position of A cation and oxygen, separation of oxygen atom, and the like. In FIG. 4, large, black circles represent cations, and small, almost gray circles represent oxygen atoms. In $a^+a^+a^+$ structure, the octahedron is shown to be rotated such that oxygen atoms regularly approach and are away from cations. In $a^-a^-a^-$ structure, a dumbbell structure is shown such that oxygen atoms having been overlapped are separated because the octahedrons on the front surface portion and the rear surface portion rotate in directions opposite to each other. In $a^0a^0a^0$ structure, since tilt does not occur, the distances between oxygen atoms are constant.

Next, in the fully connected layer, the features in the image of the filtered portion are accepted, and the classification of oxygen octahedral tilts is determined and decided.

The CNN performs a self-test using the training image prepared in first step, and in order to make accurate decision, at least several tens, furthermore, several hundreds of training processes are performed.

Third Step (Actual Image Obtainment)

An actual STEM image of a specimen is obtained by using STEM equipment. Meanwhile, in an embodiment of the present invention, STEM equipment was used, but another analysis image which can be used for analyzing the structure of a matter may be used.

Fourth Step (Analysis Using CNN)

The actual STEM image obtained in third step is applied to the CNN model. At this point, feature portions in the obtained image are extracted through the convolutional layer, and the oxygen octahedron tilt is determined through the subsequent fully connected layer.

Figure 1:
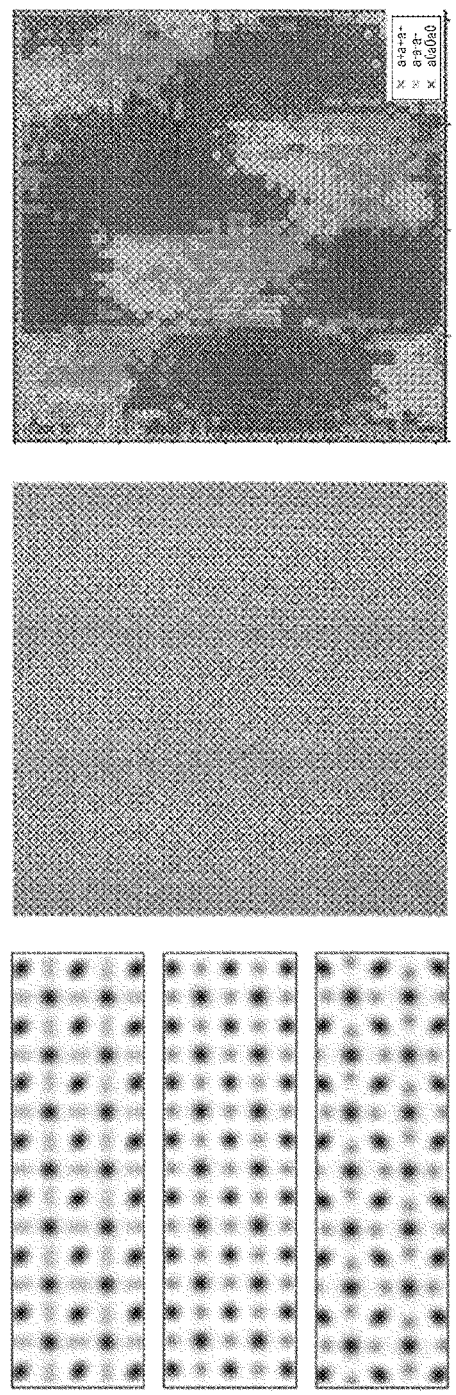
FIG. 1 illustrates a flow of an analysis according to an embodiment of the present invention.

Accordingly, coordinate information of each unit lattice and a probability about the structure that the corresponding lattice has, are output, and an atomic image is again constructed by using the coordinate information and the probability and thus, oxygen octahedron tilt mapping is performed (FIG. 1).

The invention claimed is:

1. A method of analyzing a perovskite structure using machine learning, the method comprising the steps of:
   (a) obtaining an atomic image using an atomic structure simulator;
   (b) making a convolutional neural network (CNN) model learn the atomic image;
   (c) obtaining an atomic image of an actual substance using a transmission electron microscope (TEM) or a scanning transmission electron microscope (STEM), and then applying the atomic image to the learned CNN model; and
   (d) analyzing the atomic image of the actual substance by the CNN model, and providing an output of the CNN model in relation to the perovskite structure, wherein in step (d):
   an oxygen octahedron tilt is determined and classified;

a probability about a structure which a unit lattice of the perovskite structure has is output; and the atomic image of the actual substance is constructed by using the probability about the structure which the unit lattice has, whereby oxygen octahedron tilt mapping is performed.

2. The method of claim 1,
wherein the atomic image in step (a) is obtained by using:
  a perovskite octahedron tilt structure confirmed through an experiment; and
  a computed perovskite octahedron tilt structure model.

3. The method of claim 1,
wherein the CNN model in step (b) comprises:
  a convolutional layer which extracts a geometric feature from the atomic image; and
  a fully connected layer which connects the geometric feature and specific classification of a perovskite octahedron.

4. The method of claim 2,
wherein artificial noise is added to the atomic image.

* * * * *

UNITED STATES PATENT AND TRADEMARK OFFICE
CERTIFICATE OF CORRECTION

| | |
|---|---|
| PATENT NO. | : 11,062,446 B2 |
| APPLICATION NO. | : 16/586854 |
| DATED | : July 13, 2021 |
| INVENTOR(S) | : Si-Young Choi et al. |

Page 1 of 1

It is certified that error appears in the above-identified patent and that said Letters Patent is hereby corrected as shown below:

On the Title Page

Delete Item [73] and insert the following:
--Assignee: Postech Academy-Industry Foundation, Pohang-si (KR)--

Signed and Sealed this
Tenth Day of June, 2025

Coke Morgan Stewart
*Acting Director of the United States Patent and Trademark Office*